(12) United States Patent
Chitsaz et al.

(10) Patent No.: US 7,412,665 B2
(45) Date of Patent: Aug. 12, 2008

(54) MENU MANAGEMENT IN AN OLE DOCUMENT ENVIRONMENT

(75) Inventors: Reza Chitsaz, Bellevue, WA (US); Svetlana Loksh, Bellevue, WA (US); Quan Liu, Redmond, WA (US); Thomas E. Quinn, Jr., Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 10/778,497

(22) Filed: Feb. 13, 2004

(65) Prior Publication Data

US 2005/0183034 A1    Aug. 18, 2005

(51) Int. Cl.
G06F 3/48 (2006.01)
G06F 3/00 (2006.01)

(52) U.S. Cl. .................. 715/826; 715/825; 715/810

(58) Field of Classification Search .......... 715/841, 715/825, 826, 810, 811
See application file for complete search history.

(56) References Cited

U.S. PATENT DOCUMENTS

| | | | |
|---|---|---|---|
| 5,640,579 A | | 6/1997 | Koppolu et al. |
| 5,644,738 A | * | 7/1997 | Goldman et al. ............. 715/825 |
| 5,706,458 A | * | 1/1998 | Koppolu ..................... 715/810 |
| 5,764,960 A | | 6/1998 | Perks et al. |
| 5,801,701 A | * | 9/1998 | Koppolu et al. ............. 715/821 |
| 6,229,539 B1 | | 5/2001 | Morcos et al. |
| 6,384,849 B1 | * | 5/2002 | Morcos et al. ............... 715/810 |
| 6,424,360 B1 | * | 7/2002 | Torres ........................ 715/810 |
| 6,429,882 B1 | * | 8/2002 | Abdelnur et al. ............ 715/763 |
| 6,437,810 B1 | | 8/2002 | Nakajima et al. |
| 2005/0060655 A1 | * | 3/2005 | Grey et al. ................... 715/745 |
| 2005/0076309 A1 | * | 4/2005 | Goldsmith ................... 715/811 |

OTHER PUBLICATIONS

E. Damiani, M.G. Fugini, and C. Bellettini. A Hierarchy-aware Approach to Faceted Classification of Object-oriented Components. ACM Transactions on Software Engineering and Methodology, vol. 8, Issue 3, pp. 215-262, 1999.
A. Sears and B. Shneiderman. Split Menus: Effectively Using Selection Frequency to Organize Menus. ACM Transactions on Computer-Human Interaction, vol. 1, No. 1, pp. 27-51 1994.

* cited by examiner

*Primary Examiner*—Dennis G. Bonshock
(74) *Attorney, Agent, or Firm*—Amin, Turocy & Calvin, LLP (57) ABSTRACT

A system that facilitates menu management in an OLE document environment. The system includes a menu component that receives a server menu of a server application with a container menu of a container application. The menu component detects a menu conflict between the menus. The system further includes a conflict component that resolves the conflict between a server menu item of the server menu and a container menu item of the container menu, wherein at least one of the server menu item and the container menu item is modified to be unique from the other. The conflict component then outputs the integrated final menu.

32 Claims, 7 Drawing Sheets

MENU MANAGEMENT IN AN OLE DOCUMENT ENVIRONMENT

TECHNICAL FIELD

This invention is related to software menuing systems.

BACKGROUND OF THE INVENTION

A common programming model is when one application "hosts" another application or applet where the character of the user interface changes as the hosted application is activated. One example is when a spreadsheet embedded in a word application is activated in order to manipulate the contents of the spreadsheet. When two applications want to present user interface (UI) elements to the user, conflicts can arise. One way of solving this was to hide conflicting information based on complex rules that could involve accessing the object model and/or modifying source code. OLE in-place editing technology has enabled two applications to behave as one by allowing one application to run within the frame of another. The user remains in the same frame window (within the context of the container) but is actually running another application (the server). Coordination between resources of the container and server applications is required to achieve this functionality. One of such resources is a menu.

Standard OLE menu merging allows container and server to merge their menus. However, the protocol does not handle extensive menu name collisions, except for the case of the "Help" menu. In cases when two functionally rich applications participate in menu merging, naming conflicts can be quite common. In one example, there can be a number of conflicting menus between two applications that have common menu items such as View, Tools, and Data. If these applications were to follow standard OLE menu merging protocol, the final menu would contain two identical "View" menus, two identical "Tools" menus, and two identical "Data" menu items. Moreover, usability studies show rather cumbersome and difficult usage where duplicate menus are involved. Users are frustrated when trying to accomplish tasks since there is no indication in UI which menu to use.

What is needed is an improved menuing system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a mechanism that facilitates menu management in an OLE document environment. The mechanism allows modification of a container (a host application) menu to allow menu merging in a cascading fashion where naming conflicts occur with a server application menu. Thus, if both applications wish to present a conflicting menu item, rather than display one and hide the other or show both, both can be displayed where one is a cascading menu choice off the one corresponding root menu item. This eliminates user frustration, significantly simplifies the user interface, does not clobber the menu bar, and is familiar to users. The "cascading" merge menus feature is a significant enhancement to the standard OLE solution of the problem, and does not require any changes to the server application.

In support thereof, the system includes a merge component that receives a container menu and a server menu, detects conflicts between a server menu item of the server top-level menu and a container menu item of the container top-level menu (wherein at least one of the server menu item and the container menu item is modified to be unique from the other), resolves the conflicts, and outputs an integrated final menu.

In another aspect of the present invention, the system comprises a menu component that receives the container and server menus, detects conflicts in menu items of the top-level menus, and a conflict component that resolves a conflict, and outputs the integrated final menu.

In yet another aspect of the present invention, an alternative implementation can be to modify one or both of the conflicting menu names in some coherent fashion and display both names at the root level.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
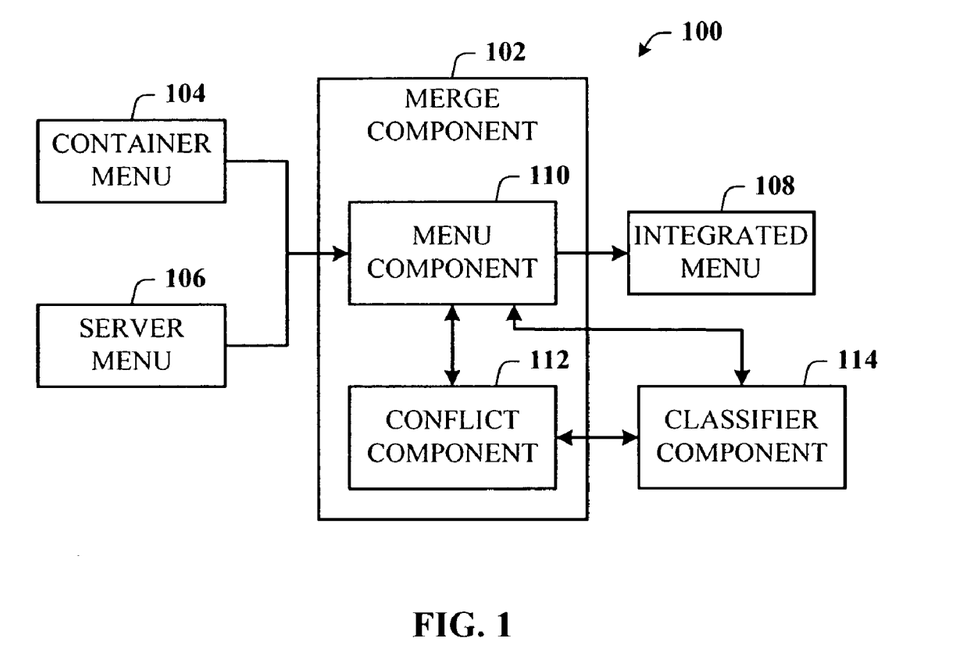
FIG. 1 illustrates a system that facilitates menu management in an OLE document environment in accordance with the present invention.

Referring now to FIG. 1, there is illustrated a system 100 that facilitates menu management in an OLE document environment in accordance with the present invention. Such document environment supports an OLE (Object Linking and Embedding) architecture. The system 100 includes a merge component 102 that facilitates receiving a container menu 104 of a container application and a server menu 106 of server application and detecting conflicts between a server menu item of the server top-level menu and a container menu item of the container top-level menu. The merge component 102 resolves the conflicts such that at least one of the server menu item and the container menu item is modified to be unique from the other. An integrated final menu is then output for use. The merge component 102 integrates the menus, in contrast to conventional mechanisms that do not allow the creation of integrated menus that include the server menu and the container menu.

In another implementation, the merge component 102 of the system 100 is employed in the form of a menu component 110 and conflict component 112 that together perform the functions previously stated with respect to the merge component 102. The menu component 110 receives the container menu 104 and the server menu 106, and detects conflicts between a server menu item of the server top-level menu and a container menu item of the container top-level menu. The conflict component 112 modifies the conflicting container menu items such that they are distinguished from server menu items and easily recognizable to the user that the modified naming belongs to the server menu items, and outputs the integrated final menu for use.

The conflict component 112 inputs the resolved (or modified) naming to the menu component 110. The menu component 110 then merges the menus such that the conflicting server menu item is subordinated as a cascading submenu item to the root-level container menu item to which it conflicted. For example, if each of the container menu and the server menu includes an Edit menu item, the menu items conflict since there are two menu items with the same name. The container Edit menu will be modified to include a unique and descriptive server menu item that relates to the Edit function of the server application. The associated Edit functions of the Edit menu of the server application are then integrated as a submenu of items under the modified container entry associated with the server Edit menu. The unique and descriptive server menu item in the container Edit menu is such that there is no confusion to the user that the server Edit menu item integrated in the container Edit menu references the server application Edit functions. The menu component 102 then outputs the integrated menu 110 for presentation to the user.

The subject invention can also employ a classifier component 114 that interfaces to both the conflict component 112 and the menu component 110 to signal the conflict component 112 to adjust the way in which it will integrate the conflicting menu items, although, the classifier component 114 is not required. The classifier component 114 makes this determination based on implicit and explicit data, and is described in more detail hereinbelow.

The container application menu 104 can contain many different types of embedded OLE documents related to different server applications. In order to maintain efficiency in using the applications, the conflict resolution and menu integration process of the present invention occurs dynamically and is transparent to the user as the user selects an embedded document for processing.

In an alternative implementation, each of the submenu items associated with the conflicting container root-level menu is modified, allowing the server menu options to be integrated into the dropdown menu of the root-level container menu item, and not as a separate cascading menu. The container application would then alter each of its submenu options to explicitly indicate to the user which of those submenu items belong to the container application. The server menu items remain unchanged. For example, if both the container and server applications have an Edit item, but the container Edit submenu contains items Edit1, Edit2, and Edit3, while the server Edit menu includes submenu items of Edit1, Edit2, and Edit4, the integrated menu can list the items CEdit1, CEdit2, CEdit3, Edit1, Edit2, and Edit4, or in any order. The conflict component 108 resolved the conflicting menu items by modifying the container menu items to include the "C" prefix to uniquely identify the CEditx items as related to the container application.

It is within the contemplation of the present invention that the server application menu items can be modified instead of or in combination with the container application menu items. This can require more extensive configuration and mapping, however.

Figure 2:
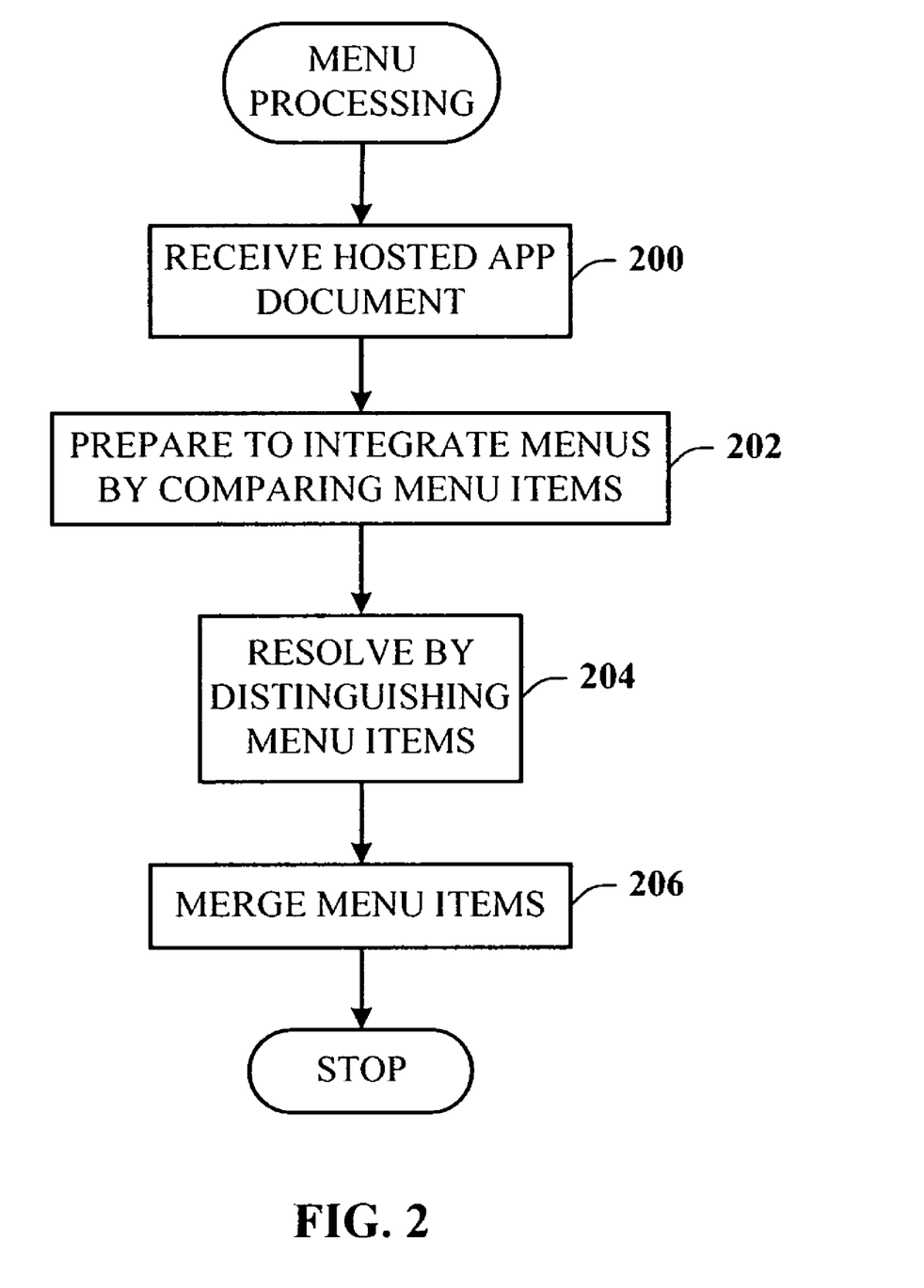
FIG. 2 illustrates a flow chart of a menu integration process in accordance with the present invention.

Referring now to FIG. 2, there is illustrated a flow chart of a menu integration process in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the container (or host) application is provided with a server OLE document that is associated with a server (or hosted) application. At 202, the system prepares to integrate the container menu and server menu by comparing the menu items to detect conflicts. At 204, the system resolves the naming conflicts by distinguishing the menu names from one another. At 206, the server menu is integrated with the modified container menu and presented as an integrated menu. The process then reaches a Stop block.

Figure 3:
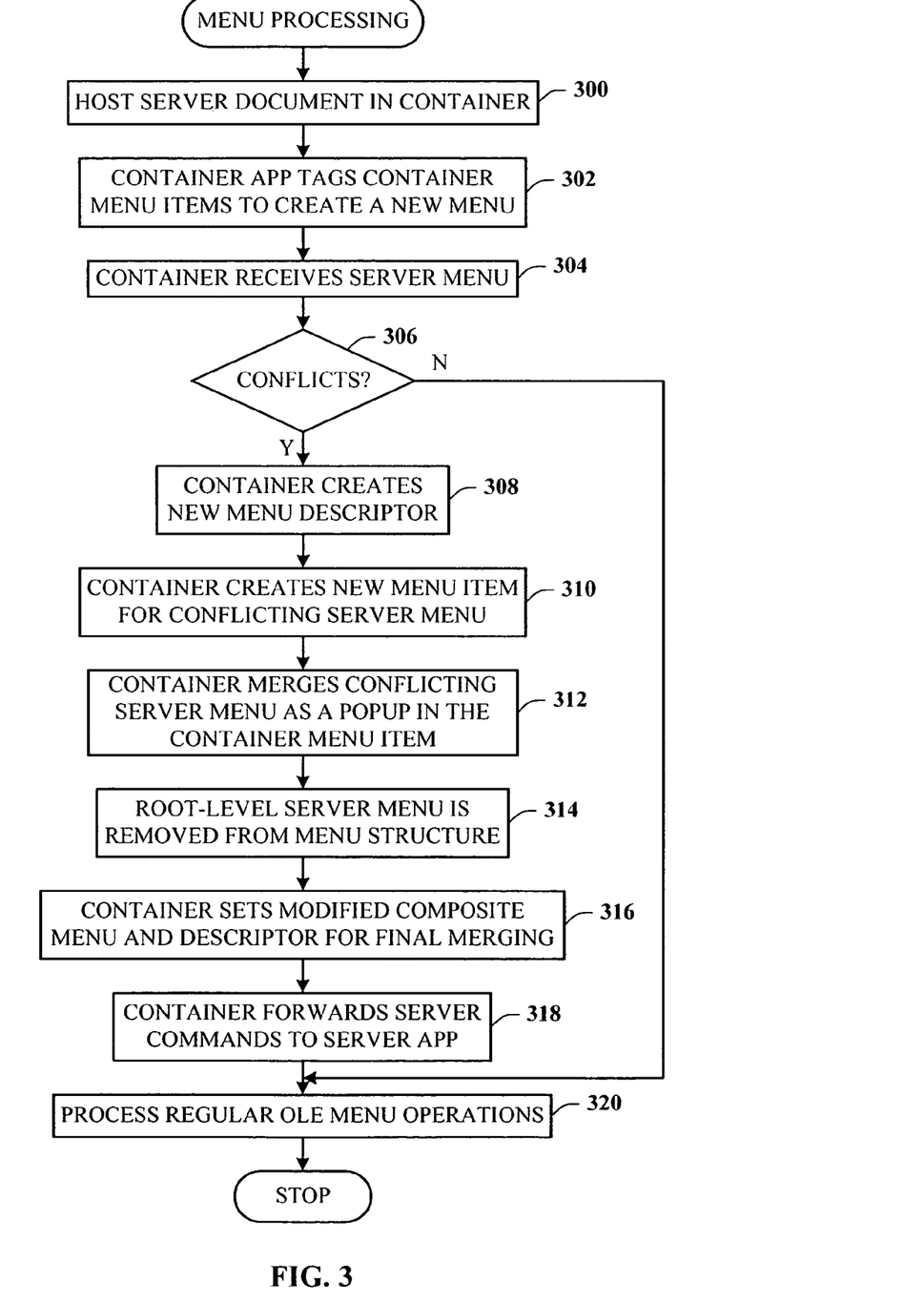
FIG. 3 illustrates a detailed flow chart of the menu merging process of the present invention.

Referring now to FIG. 3, there is illustrated a detailed flow chart of the menu merging process of the present invention. At 300, the server OLE document is hosted in the container. In response to a user opening the hosted document using the container application and launching the server OLE document, the corresponding server application will launch. At 302, the container tags the container menu items with unique information, e.g., a predefined prefix. The unique information can comprise at least one of coloration of graphical indicia of the menu item, prefix information, suffix information, and one or more additional descriptive words.

At 304, the container receives the server menu. At 306, the system determines if a conflict exists between any of the menu items of the server and container. If so, flow is to 308 where the container creates a new menu descriptor. At 310, the container creates a new menu item for the conflicting server menu. At 312, the container merges the conflicting server menu as a pop-up in the container menu item. At 314, the root-level server menu is removed from the menu structure. At 316, the container sets the modified composite menu and descriptor for final merging. At 318, the container forwards server commands to the server. At 320, regular OLE menu operations are processed. The process then reaches a Stop block. If no conflicts are detected, flow is from 306 to 320 to call the modified menu for presentation to the user and process regular OLE menu operations accordingly.

More specifically, the following three modifications to the OLE menu merging process are performed to achieve this functionality. In the container application implementation of a IOleInPlaceFrame::InsertMenus,

```
HRESULT InsertMenus (
    HMENU hmenuShared,           //Handle to empty menu
    LPOLEMENUGROUPWIDTHS         //Pointer to array
    lpMenuWidths
)
``` the container application marks each of its menu items with a predefined prefix and adds the prefixed menu items to hmenuShared. The prefix is used to create a new OLEMenuDescriptor in the following SetMenu call and for identifying menu items belonging to the container application.

In the container implementation of the IOleInPlaceFrame::SetMenu,

```
HRESULT SetMenu (
    HMENU hmenuShared,           //Handle to composite menu
    HOLEMENU holemenu,           //Handle to menu descriptor
    HWND hwndActiveObject        //Handle to object's window
);
``` the container creates a replacement for hmenuShared (a composite menu) and holemenu (a menu descriptor), if menu name conflicts are identified. The container then checks the menu items for name conflicts. The container uses the prefix added in the IOleInPlaceFrame::SetMenus to distinguish between the container and server menus. When a conflict is identified, the container modifies menus in accordance with steps 310 and those that follow. Note that the acts of prefixing the container menu items and creating the replacement menu and descriptor can be configured to be performed only after a conflict is detected. This provides a means of preserving system resources that would not need to be expended if the conflict does not occur.

Figure 4:
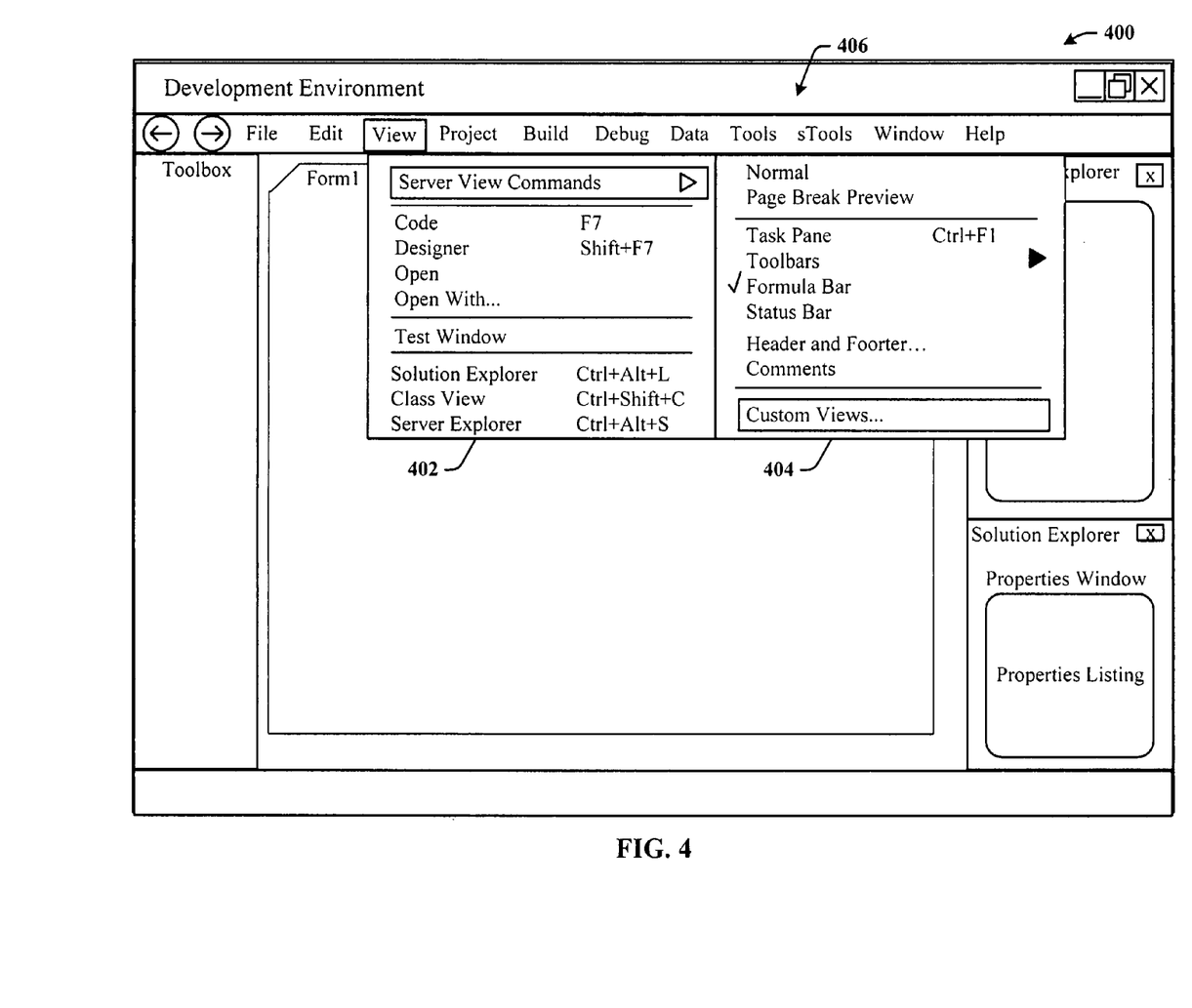
FIG. 4 illustrates a window showing a final integrated and cascading menu in accordance with the present invention.

Referring now to FIG. 4, there illustrated a window 400 showing a final integrated and cascading menu in accordance with the present invention. Here, the container is a development environment application and the server document causes the server application to be called such that at least the View menu items are in conflict. The container modifies its existing View menu 402 to include the server View menu 404 (accessible through and notated as Server View Commands). The container presents to the user text that clearly identifies the location of the server View menu options within the container View menu 402. An expansion arrow associated with the Server View Commands menu option facilitates accessing the cascaded server submenu items.

In an alternative implementation of the present invention, one or both of the conflicting menu item names can be modified in some coherent fashion with both names displayed at the root level. Here, the Tools menu items 406 conflict between the container application and the server application. However, one of the menu items is modified with a prefix "s" to indicate that the menu item "sTools" is associated with the server application, while the container menu item "Tools" remains unchanged.

This modified naming at the root level can also be used in combination with the cascading aspect of the present invention. For example, it may be preferable to display more frequently used menu items at the root level for quicker access, while those menu items that are used less frequently can be integrated into the cascading menu style. This can be predetermined on a user-by-user basis, such that the menu component accesses the login information of the user, and automatically employs the desired menuing environment based on the user login preferences.

In another implementation, the system employs the classifier component 114 of FIG. 1 that monitors the activity of the user such that user activities related to the document environment are monitored over time. If the user accesses one or more buried menu items more than other menu items, the classifier can signal the menu component to revise the menu system to place the more frequently used menu item(s) at the root level with an identifier that clearly distinguishes the menu item(s) to either the container application or the server application.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) may be used to automatically determine according to a predetermined criteria when to signal the menu component to change menu integration based on the user preferences, to change the menu based on the type of data and the type of container and server applications and documents, etc. The criteria can include, but is not limited to, the amount of data to represented in the server document, and the number of conflicting menu items to be modified, the importance of the data.

Figure 5:
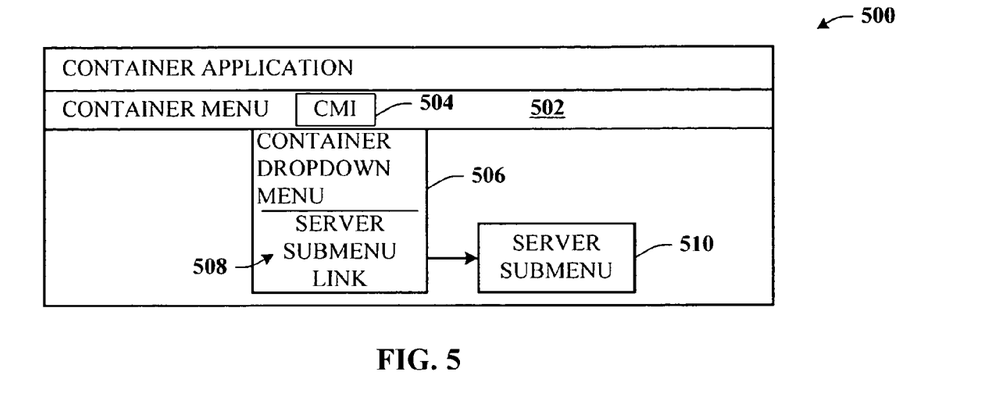
FIG. 5 illustrates a container window showing a generalized container/server merged menu system in accordance with the present invention where the container menu is the root-level menu.

Referring now to FIG. 5, there illustrated a container window 500 showing a generalized container/server merged menu system in accordance with the present invention where the container menu is the root-level menu. The container window 500 shows the container menu 502 with a conflicted menu item (CMI) 504. The CMI 504 includes a modified dropdown menu 506 that includes a server submenu link 508 to a cascading server submenu 510. Note that the CMI 504 and associated conflicting server items can also be modified with different colors or other distinguishable graphical indicia such that the user can more quickly identify the location of the menu items.

Figure 6:
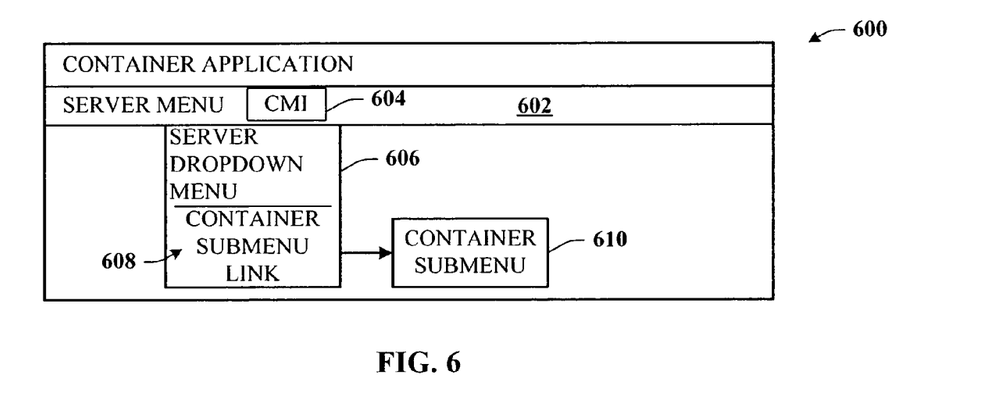
FIG. 6 illustrates a container window showing a generalized container/server merged menu system in accordance with the present invention where a server menu is the root-level menu.

Referring now to FIG. 6, there illustrated a container window 600 showing a generalized container/server merged menu system in accordance with the present invention where a server menu 602 is the root-level menu. The container window 600 shows the server menu 602 with a conflicted menu item (CMI) 604. The CMI 604 includes a modified dropdown menu 606 that includes a container submenu link 608 to a cascading container submenu 610. Note that the CMI 604 and associated conflicting container items can also be modified with different colors or other distinguishable graphical indicia such that the user can more quickly identify the location of the menu items.

Figure 7:
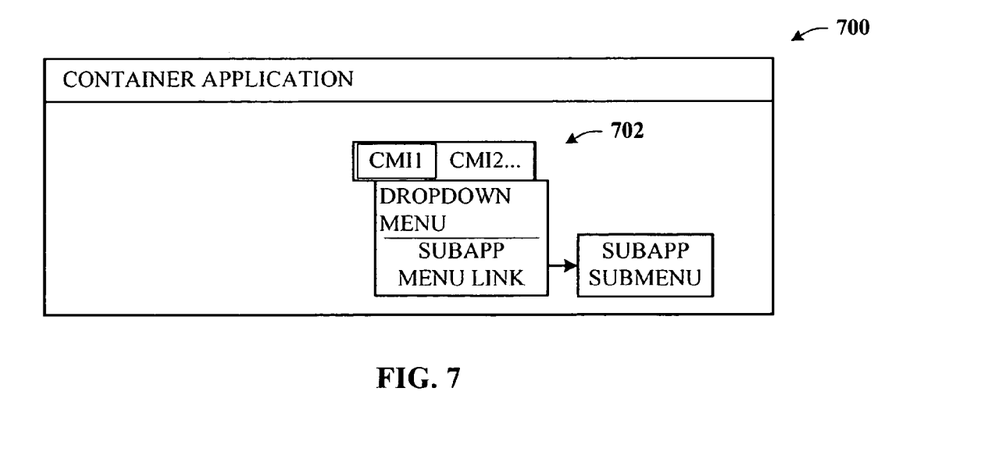
FIG. 7 illustrates a window showing a generalized container/server merged menu system in accordance with the present invention where the root-level menu is free floating.

Referring now to FIG. 7, there illustrated a window 700 showing a generalized container/server merged menu system in accordance with the present invention where the root-level menu 702 is free floating. The container application is controlled by a user setting that allows the root-level menu to be positioned or floated according to the wishes of the user. Here, the root-level menu 702 can be collapsed and move to any position selected by the user. Additionally, the cascading serve submenu can be accessed from a CMI1 item, or any other conflicting menu item between the server and container applications.

Figure 8:
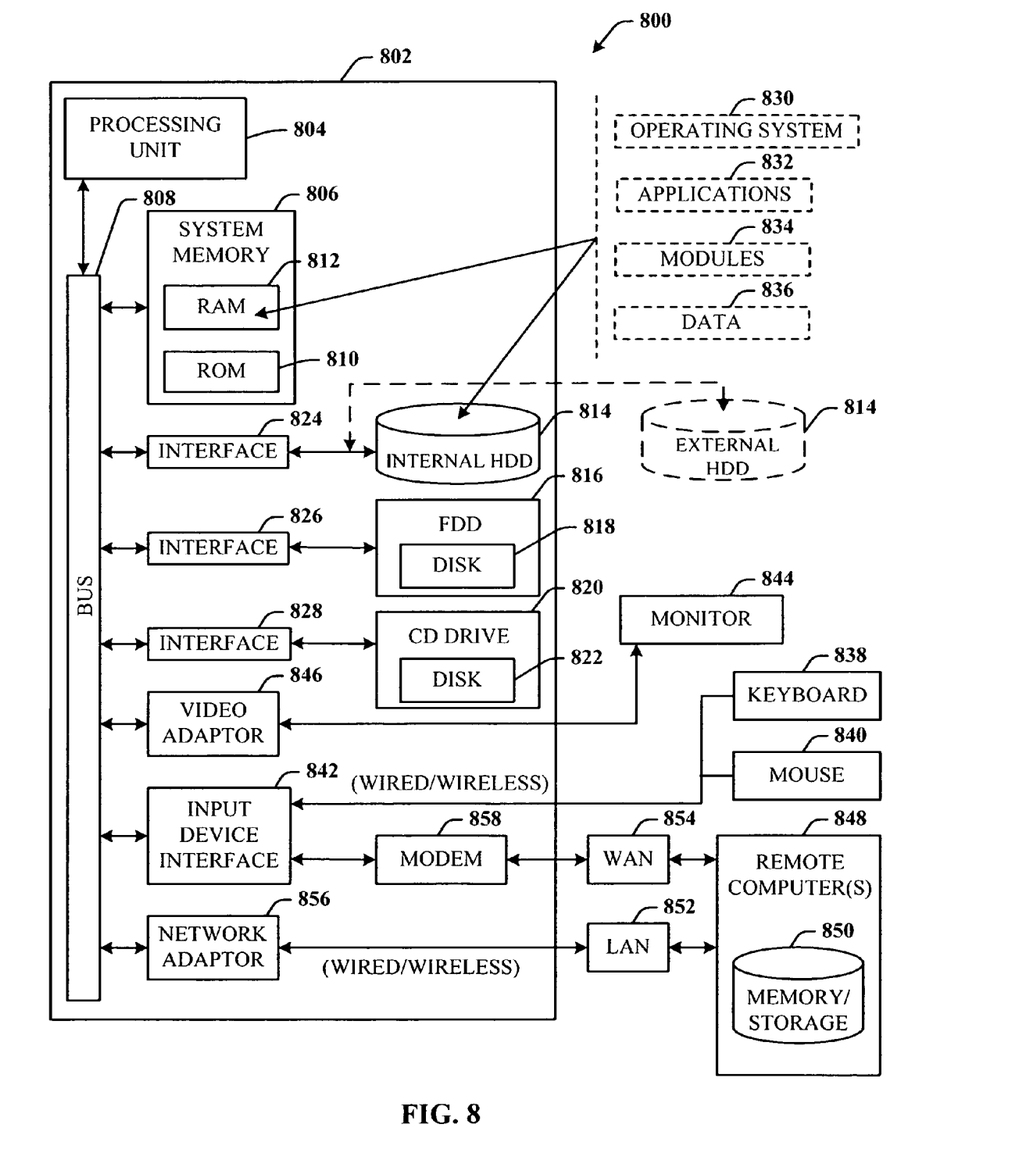
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the present invention, FIG. 8 and the following discussion are intended to provide a brief, general description of a suitable computing environment 800 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, there is illustrated an exemplary environment 800 for implementing various aspects of the invention that includes a computer 802, the computer 802 including a processing unit 804, a system memory 806 and a system bus 808. The system bus 808 couples system components including, but not limited to, the system memory 806 to the processing unit 804. The processing unit 804 may be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a nonvolatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 812, including an operating system 830, one or more application programs 832, other program modules 834 and program data 836. All or portions of the operating system, applications, modules, and/or data can also be cached in the RAM 812.

It is appreciated that the present invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but may be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers etc.

The computer 802 may operate in a networked environment using logical connections via wired and/or wireless communications to one or more remote computers, such as a remote computer(s) 848. The remote computer(s) 848 may be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices, and companies, and facilitate enterprise-wide computer networks, such as intranets, all of which may connect to a global communication network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856. When used in a WAN networking environment, the computer 802 can include a modem 858, or is connected to a communications server on the LAN, or has other means for establishing communications over the WAN 854, such as by way of the Internet. The modem 858, which may be internal or external and a wired or wireless device, is connected to the system bus 808 via the serial port interface 842. In a networked environment, program modules depicted relative to the computer 802, or portions thereof, may be stored in the remote memory/storage device 850. It will be appreciated that the network connections shown are exemplary and other means of establishing a communications link between the computers may be used.

The computer 802 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 9:
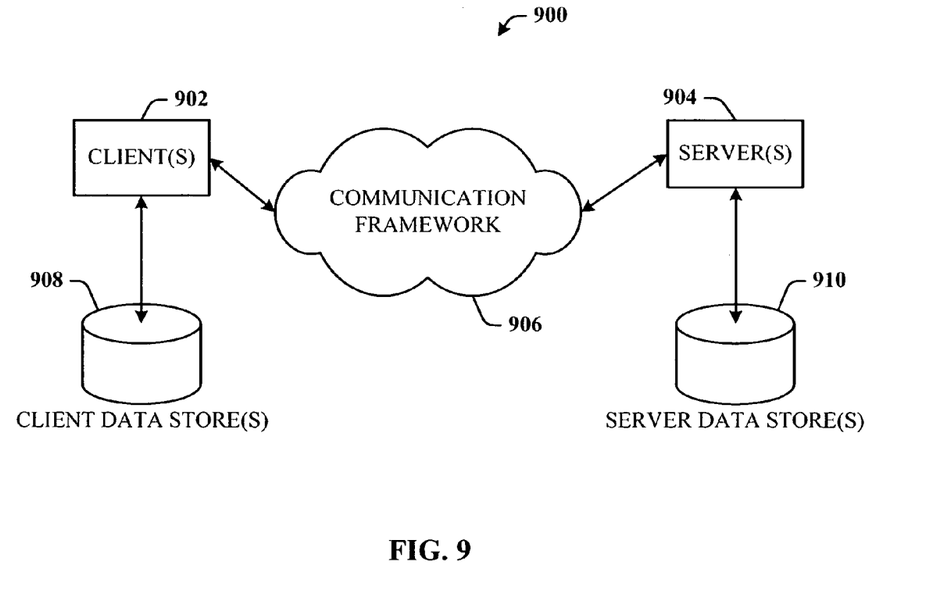
FIG. 9 illustrates a schematic block diagram of an exemplary computing environment in accordance with the present invention.

The container/server menuing architecture of the present invention supports a distributed environment where the container resides on a client and the embedded server document launches the corresponding server application from a remote location. Referring now to FIG. 9, there is illustrated a schematic block diagram of an exemplary computing environment 900 in accordance with the present invention. The system 900 includes one or more client(s) 902. The client(s) 902 can be hardware and/or software (e.g., threads, processes, computing devices). The client(s) 902 can house cookie(s) and/or associated contextual information by employing the present invention, for example. The system 900 also includes one or more server(s) 904. The server(s) 904 can also be hardware and/or software (e.g., threads, processes, computing devices). The servers 904 can house threads to perform transformations by employing the present invention, for example. One possible communication between a client 902 and a server 904 may be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications may be facilitated via a wired (including optical fiber) and/or wireless technology. The client(s) 902 are operably connected to one or more client data store(s) 908 that can be employed to store information local to the client(s) 902 (e.g., cookie(s) and/or associated contextual information). Similarly, the server(s) 904 are operably connected to one or more server data store(s) 910 that can be employed to store information local to the servers 904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer readable storage medium that facilitates menu management in an Object Linking and Embedding (OLE) document environment, comprising:
    a menu component that integrates a server menu of a server application with a container menu of a container application;
    a conflict component that resolves a conflict between at least one server menu item of the server menu and at least one container menu item of the container menu, wherein at least one of the server menu item and the container menu item is modified to be unique from the other, the conflict component automatically determines when to signal the menu component to change menu integration of the server menu and container menu, wherein the conflict component makes the determination based upon a user specified preference of a predetermined number of conflicting menu items to be modified, the menu component changes menu integration upon being signaled by the conflict component; and
    a merge component to automatically infer a revision to an integrated menu, wherein the inference is based upon observation of a user's activity with at least one of the server application or container application, wherein the inference is based upon at least the user accessing a sub-menu item more often than other menu items, wherein the sub-menu item is moved to a root level of a revised integrated menu.

2. The system of claim 1, one of the server menu and the container menu is presented as a root-level menu while the other is presented as a submenu to the root-level menu.

3. The system of claim 1, the server menu is presented as cascading from the container menu.

4. The system of claim 1, the container menu item is modified and placed at a root level with the server menu item.

5. The system of claim 1 is employed in an object linking and embedding (OLE) architecture.

6. The system of claim 1, the container application tags the container menu item with a prefix that identifies the menu item as associated with the container application.

7. The system of claim 6, the prefix is used in a SetMenu call.

8. The system of claim 1, the container application tags the container menu item with a prefix that identifies the menu item as associated with the container application, the tagged menu item is added to an hmenuShared menu.

9. The system of claim 1, the container application creates at least one of a replacement composite menu and a menu descriptor.

10. The system of claim 9, the replacement composite menu and the menu descriptor are created only when the conflict is detected.

11. The system of claim 1, the container application calls the replacement composite menu and the menu descriptor for merging.

12. The system of claim 1, the container application forwards a server command to the server application.

13. The system of claim 1, further comprising a classifier component that automatically signals the menu component to modify the container menu in a predetermined way.

14. The system of claim 13, the classifier component is a support vector machine.

15. A computer employing the system of claim 1.

16. The system of claim 1, the container menu is free floating.

17. A system embodied on a computer readable storage medium that facilitates menu management in an Object Linking and Embedding (OLE) OLE environment, comprising a merge component that receives a container menu and a server menu, detects one or more conflicts between the container menu and the server menu, resolves the conflicts, and outputs an integrated menu, the merge component automatically changes menu integration of the server menu and container menu upon a number of conflicting menu items meeting a user preference of a predetermined number of conflicting menu items to be modified, wherein at least one of the server menu item and the container menu item is modified to be unique from the other, the merge component automatically infers a revision to the integrated menu, wherein the inference is based upon observation of a user's activity with at least one of the server application or container application, wherein the inference is based upon at least the user accessing a sub-menu item more often than other menu items, wherein the sub-menu item is moved to a root level of a integrated menu.

18. The system of claim 17, the container menu is presented as a root-level menu while the server menu is presented as cascading from the container menu.

19. The system of claim 17, the container menu item is modified, and a menu item of the server menu is integrated into the container menu at a root level.

20. The system of claim 17, the container menu is identified by a change to associated graphical indicia, which change comprises at least one of adding coloration, adding prefix information, adding suffix information, and adding one or more additional descriptive words.

21. The system of claim 17, the server menu associated at a root-level is removed from the integrated final menu.

22. The system of claim 17, the conflict between the server menu and the container menu is a conflicting menu item, which conflicting menu item of the container menu includes a menu item of the server menu associated with the conflicting menu item.

23. The system of claim 17, the server menu is presented as cascading from the container menu.

24. A method of managing a menu in an Object Linking and Embedding (OLE) document environment, comprising:
receiving a server menu of a server application and a container menu of a container application;
comparing the server menu and the container menu;
detecting one or more conflicting menu items between the server menu and the container menu;
merging the server menu and the container menu;
modifying one of the server menu and the container menu to resolve the one or more conflicts upon the number of conflicts meeting a user preference of a predetermined number of conflicting menu items to be modified; and
revising the merged menus based upon automatically inferring when to revise the merged server menu and container menu, wherein the inference is based upon observation of a user's activity with at least one of the server application or container application, wherein the inference is based upon at least the user accessing a sub-menu item more often than other menu items, wherein the sub-menu item is moved to a root level of a revised merged menus.

25. The method of claim 24, the conflicting menu item is one that is other than a Help menu item.

26. The method of claim 24, further comprising tagging each menu item of the container menu with unique information.

27. The method of claim 26, the unique information comprises at least one of coloration of graphical indicia of the menu item, prefix information, suffix information, and one or more additional descriptive words.

28. The method of claim 24, further comprising creating a replacement composite menu and a menu descriptor.

29. The method of claim 28, the composite menu is associated with hmenuShared, and the descriptor is associated with holemenu.

30. A computer implemented method of managing a menu in an Object Linking and Embedding (OLE) environment, the method comprising:
receiving a server menu of a server application and a container menu of a container application;
comparing the server menu and the container menu;
detecting one or more conflicting items between the server menu and the container menu;
tagging the container menu with unique information;
integrating the server menu into the container menu in a cascaded fashion; and
modifying one of the server menu and the container menu to resolve the one or more conflicts upon the number of conflicts meeting a user preference of a predetermined number of conflicting menu items to be modified;
revising the integrated menus based upon automatically inferring when to revise the integrated server menu and container menu, the inference based upon observation of a user's activity with the integrated menu, wherein the inference is based upon at least the user accessing a sub-menu item more often than other menu items, wherein the sub-menu item is moved to a root level of a revised integrated menu.

31. The method of claim 30, further comprising:
receiving server application commands; and
forwarding the server application commands to the server application.

32. A system embodied on a computer readable storage medium that facilitates managing a menu in an Object Linking and Embedding (OLE) environment, comprising:
means for receiving a server menu of a server application and a container menu of a container application;
means for comparing the server menu and the container menu;
means for detecting one or more conflicting items between the server menu and the container menu;
means for integrating the server menu into the container menu in a cascaded fashion;
means for modifying one of the server menu and the container menu to resolve the one or more conflicts upon the number of conflicts meeting a user preference of a predetermined number of conflicting menu items to be modified; and
means for revising the integrated menus based upon automatically inferring when to revise the integrated server menu and container menu, the inference based upon observation of a user's activity with the integrated menu, wherein the inference is based upon at least the user accessing a sub-menu item more often than other menu items, wherein the sub-menu item is moved to a root level of a revised integrated menu.

* * * * *